United States Patent [19]

Lapeyre

[11] Patent Number: 4,951,607
[45] Date of Patent: Aug. 28, 1990

[54] AQUARIUMS

[76] Inventor: James M. Lapeyre, 13 Richmond Pl., New Orleans, La. 70115

[21] Appl. No.: 335,494

[22] Filed: Apr. 10, 1989

[51] Int. Cl.<sup>5</sup> ............................................. A01K 63/00
[52] U.S. Cl. .......................................... 119/5; 272/26
[58] Field of Search .......................... 119/3, 5; 272/26

[56] References Cited

U.S. PATENT DOCUMENTS

| 1,764,345 | 6/1930 | Schlotz | 119/5 |
|---|---|---|---|
| 1,974,068 | 9/1934 | Greensaft | 119/5 |
| 3,664,301 | 5/1972 | Morrill | 119/5 |
| 3,696,789 | 10/1972 | Richard | 119/5 |
| 3,874,336 | 4/1975 | Murphy | 119/5 |
| 4,516,529 | 5/1985 | Lotito et al. | 119/5 |

FOREIGN PATENT DOCUMENTS 2577125  8/1986  France .............................. 119/5

Primary Examiner—John Weiss
Attorney, Agent, or Firm—Laurence R. Brown

[57] ABSTRACT

This invention provides a public aquarium with improved features for permitting the viewing public observers to better see aquatic life in the aquarium in its natural state. This structure includes a specially constructed and lighted viewing chamber and viewing window interface. In particular, a public aquarium is specially constructed with a viewing window interface construction optimizing viewing conditions for the observers and reducing maintenance of the aquarium by keeping the inner window surface more algae free. Thus, in a preferred embodiment a lens-like curved viewing window is focally directed toward an optically blackened surface and is oriented at an off-vertical slant to a vertical aquarium wall in the vicinity of an observer station to limit reflections of direct light rays off the window toward an observer when looking into the aquarium. The lens curves inwardly into the tank water to permit thinner window structure further improving visibility yet withstanding water pressure and expediting water seals. Lighting in the viewing chamber outside the aquarium structure is constructed to prevent intrusion of outside lighting into the tank, where it might form algae on the window or interfere with viewing of the aquatic life in the tank.

10 Claims, 2 Drawing Sheets 4,951,607

1

AQUARIUMS

FIELD OF THE INVENTION

This invention relates to aquariums, and the like, and more particularly it relates to provision of an improved viewing interface between fishlife and human observers in a public aquarium environment.

BACKGROUND OF THE INVENTION

In the aquarium prior arts significant attention has been given to the observation of fishlife by human observers. Some typical patented art is thus now discussed. Such structures as the wall mountable aquarium of U.S. Pat. No. 3,874,336, issued to V. Murphy Apr. 1, 1975 or the prismatic shaped aquarium of U.S. Pat. No. 3,696,789 issued to E. Richard Oct. 10, 1972 represent typical aquarium features providing visual aids to the observer. Respectively a wall mounted bubble type aquarium extends outwardly from a flat wall and the aquarium is prismatically shaped to produce light interference patterns. Such art is for small private aquarium structure to be viewed in a home or the like, and produces undesirable reflections and interference with the fishlife view in the viewing interface.

Special purpose aquarium viewing structure as set forth in U.S. Pat. No. 1,764,356 to E. Schlotz June 17, 1930 provides an optical system for introduction into the observer's view of entertainers located behind the aquarium viewing panel of a public aquarium.

Aquarium art constructed for lighted observation through viewing panels is represented by the U.S. Pat. Nos.: 1,974,068 to I. Greensaft Sept. 18, 1934 and 2,595,085 to F. Kuriyama Apr. 29, 1952. The framing or decorative effect of a small room sized aquarium is of prime interest in this type of aquarium art without removal of interfering reflections or images from the surface of the windows in the viewing interface.

Clearly, with the accent upon decor, the most important reason for having aquariums is lost in such prior art, namely the unimpeded visibility of the fishlife behavior in its natural habitat. Little attention thus has been addressed to the requirements for human observation under best conditions at large public aquariums. Nor, has the effect of aquarium construction upon fishlife activity and health, or upon aquarium maintenance been given attention. For example, if bright sun-light is maintained outside the aquarium, that undesirably tends to breed algae if it is directed on the aquarium windows. Such algae inhibits viewing and need be cleaned off inside window surfaces of the aquarium. Clearly the critical nature of water-to-window-to-air interfaces in aquariums at the viewing window is critical and prior art aquariums are not ideally constructed for an unimpeded view through aquarium viewing windows of fishlife in its natural habitat.

Furthermore prior art aquarium construction does not consider the construction cost and maintenance cost of the viewing interface between the water, glass and air media.

These problems are more profound because of the preference of human observers to be in a high ambient light environment, which because of the reflection qualities of window surfaces greatly interferes with the ability of the human eye to observe the details of fishlife, particularly residing in subdued light conditions preferred as a habitat inside some aquariums. Subdued light in the observer's quarters is undesirable because of the possibility of observers falling or bumping into unobserved obstacles in the public aquarium environment.

Therefore, it is an object of this invention to provide improved aquariums, and the like, for viewing animal life, which resolves these problems in the prior art.

It is a more specific object of this invention to provide public aquarium structure with an improved viewing interface between the fishlife and the observer permitting clearer vision into the aquarium from a brightly lighted exterior.

DISCLOSURE OF THE INVENTION

The preferred aquarium embodiment of this invention has a water tank with lighting means for establishing a light level in the aquarium water for permitting observation of the fishlife therein, and preferably also to establish a natural environment for the fishlife therein, such as usually found underwater where such fishlife generally resides. The light level inside the aquarium, if subdued will make it more difficult to view the details of the fishlife from a bright environment such as sunshine or a brightly lighted room outside an aquarium tank through an observation window. Thus the outside brighter light level reflects off the window and impedes viewing. The reflections at the water, air and glass interfaces and the internal reflections within a glass window pane all are critical to a clear view into the aquarium. Therefore, this invention controls the water to glass to air interface between inside and outside light, and does it in a manner that permits better observation of the fishlife, even in subdued light levels of their natural habitat, from brighter observer's quarters outside the aquarium tank. Also the invention provides various interacting public aquarium construction features facilitating the observation of fishlife within an aquarium tank, or the like, through a viewing window and simpler aquarium maintenance.

Accordingly, a special viewing window and observer station is provided by this invention, so that the observer may have a comfortable high ambient light condition in a lighted viewing station without disturbing the view into the aquarium. The air-glass-water interface construction of this invention eliminates reflections, glare and outside light interferences with the observation of the fishlife residing within the tank. This is achieved with an "anti-reflective" viewing window panel interface. Thus, a preferably inwardly curved into the water glass window interface with its outer surface comprising a viewing window panel slanted away from vertical to position it angularly with a viewing station is provided for restricting reflections from that surface which interfere with a direct view into the aquarium. Such reflections are particularly distracting in the presence of higher light levels outside the tank.

The specially constructed observer's station structure for a public aquarium embodiment includes a lighted viewing compartment having an upper ledge with a light absorbing lower surface extending outwardly from the water to air interface. Slanted and curved window structure then directs reflections off the window as viewed at an observer's station into the light absorbing surface rather than back into a bright light such as sunlight, thereby to significantly reduce interference with a direct view into the water. By the curvature and tilting of the viewing window off vertical, the viewing path through the window is not cluttered by reflection and glare interference and a direct clear view is afforded into the tank. The observer "sees" a black background rather than reflections of high powered lamps, mirrored images, or the like visible in the viewing window from positions external to the tank that would otherwise be accentuated, particularly whenever the level of light outside the tank is higher than that inside the tank. Furthermore the curved surface permits a thinner window glass and simplifies water to glass to aquarium tank wall seals, for less costly and longer life, lower maintenance construction at lower cost.

A lighted observer station outside the viewing window is established in such a way that the interior of the tank is clearly seen through the viewing window panel without distraction by glare and reflections to study the behavior of the fishlife in its natural environment even when at subdued light levels.

External lighting for the observers may be provided consistent with the objectives of this invention by directing light rays from sources outside the tank away from direct line of sight into the viewing window so that lights neither reflect off the window surface into an observer's view nor enter the tank directly to grow algae on the window that interferes with observation and requires aquarium maintenance to remove the underwater algae.

A novel and material feature of this invention is the provision of a viewing station in an aquarium, or the like, with controlled lighting at the critical water-air-glass interfaces, thereby permitting observers to better view fishlife in their natural water habitat.

BRIEF DESCRIPTION OF THE DRAWING

FIG. 2 is a generalized cut-away embodiment in section of a further embodiment of the improved air to glass to water interface structure of this invention at a viewing window in an aquarium, or the like.

THE PREFERRED EMBODIMENTS

Figure 1:
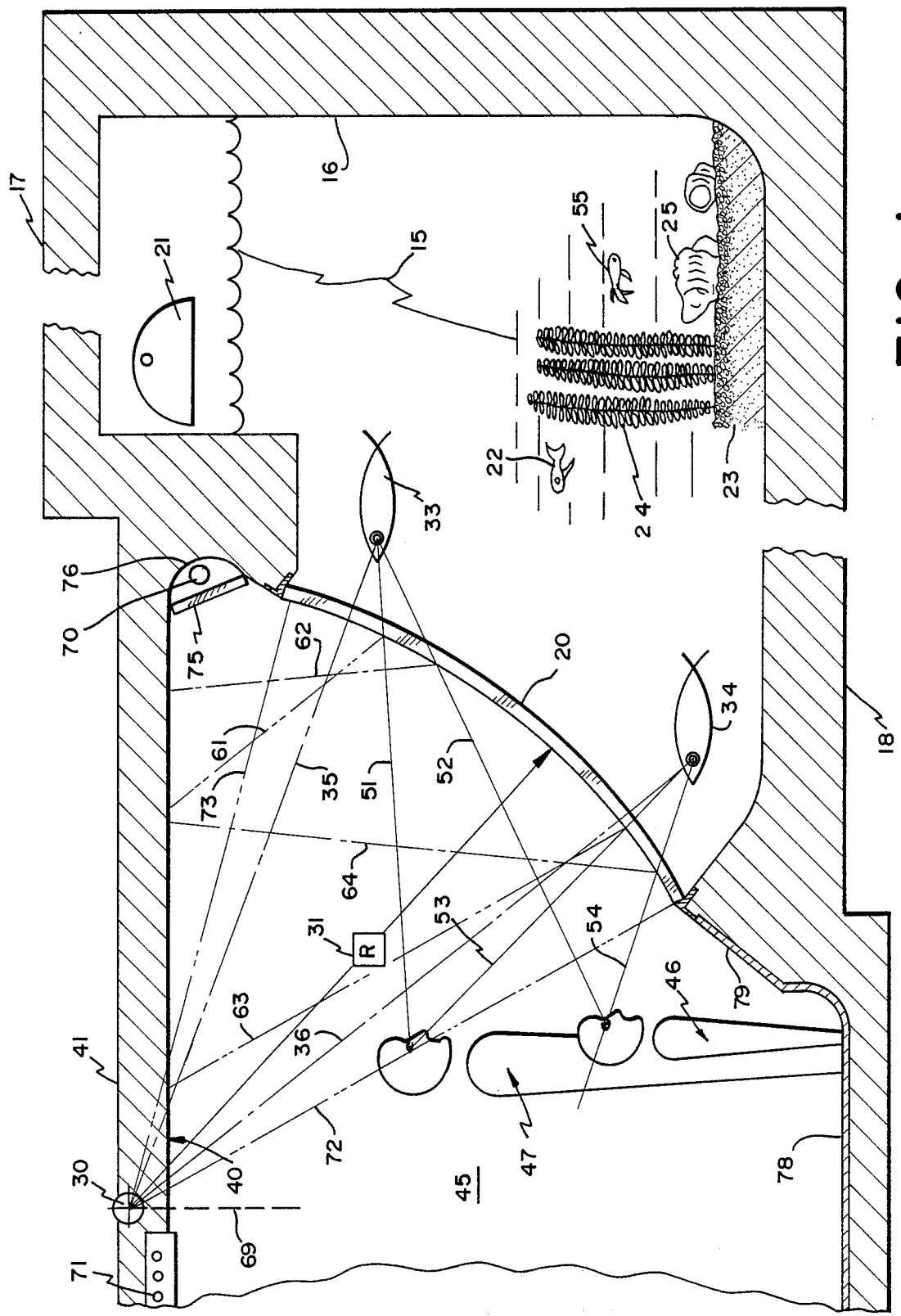
FIG. 1 is a broken away side view sketch partly in section of a preferred public aquarium embodiment viewing station constructed in accordance with the teachings of this invention.

The preferred public aquarium embodiment is shown in FIG. 1 with a body of water 15, such as contained within a tank, which may be provided with light excluding walls 16 and floor 18. Top cover 17 if desired may control internal lighting levels along with light fixture 21. Where appropriate the interior lighting is controllable from the lamp 21 for adjusting the light level in the aquarium. Bottom gravel 23, plants 24, shells or rocks 25, etc. establish a natural environment in which the fishlife may hide, rest or play, and establish a background for viewing the behavior of the fishlife under natural conditions.

The viewing window 20 of this embodiment is curved inwardly to form a window-lens with respect to light rays reflected off the outside surface, having a locus or focal point 30 positioned exterior to the tank, and thus is typically a cylindrical segment with a radius R as indicated at 31. Sealing of windows into aquarium tank walls is typically achieved conventionally by means such as set forth in U.S. Pat. No. 4,037,563 issued to J. Pflueger, et al. Jul. 26, 1977 to resolve leakage and water pressure problems at the joints. Because of the inwardly curved surface of window 20, simpler seals 80 are feasible, and thinner glass panes.

At this window 20 between the water and air viewing interface, the observers 46, 47, can look directly into the tank to see the fishlife, 33, 34, etc. as indicated by slight lines 50–54, (shown without refraction at the interface). When the light level inside the tank is less than in the viewing chamber 45, typically sunlight, the contrast of a higher light level in the viewing chamber 45 than in the tank water 15, conventional vertical window aquarium construction would induce reflections off the outside surface of the window 20, thus making it more difficult to see the fishlife details, such as detecting fish 55 hiding in and blending with the shadows of plants 24 for example. Whenever the light level outside the aquarium is higher than the light level inside, there would be reflections of lights and images on the transparent window 20 surface of high enough light level to seriously interfere with vision of an observer into the aquarium in the absence of the window structure shown herein.

The curved window 20, which is slanted generally from vertical, serves to eliminate glare or reflections from the exterior surface that would disturb observation of the fishlife by observers 46, 47 located at the observation station. Thus, by consideraton of the dotted lines of sight 60–63 of reflections from the generally slanted exterior window 20 surface to the observers looking into the aquarium effectively look into the optically black under surface 40 of the ledge 41. Thus the reflections and glare from external sunlight or lamps outside the window 20 in viewing compartment 45 are substantially reduced. Such optical techniques for glare and reflection elimination are described under different circumstances for example in U.S. Pat. Nos. 1,096,191 issued to T. Peterson May 12, 1914; or 1,911,881 issued to G. Brown May 30, 1933. My U.S. Pat. Nos. 4,032,222 issued June 28, 1977; 4,668,026 issued May 26, 1987 and 4,779,139 issued Oct. 18, 1988 also provide "non-reflective" structure for eliminating reflections from the surfaces of computer displays and the like.

Figure 2:
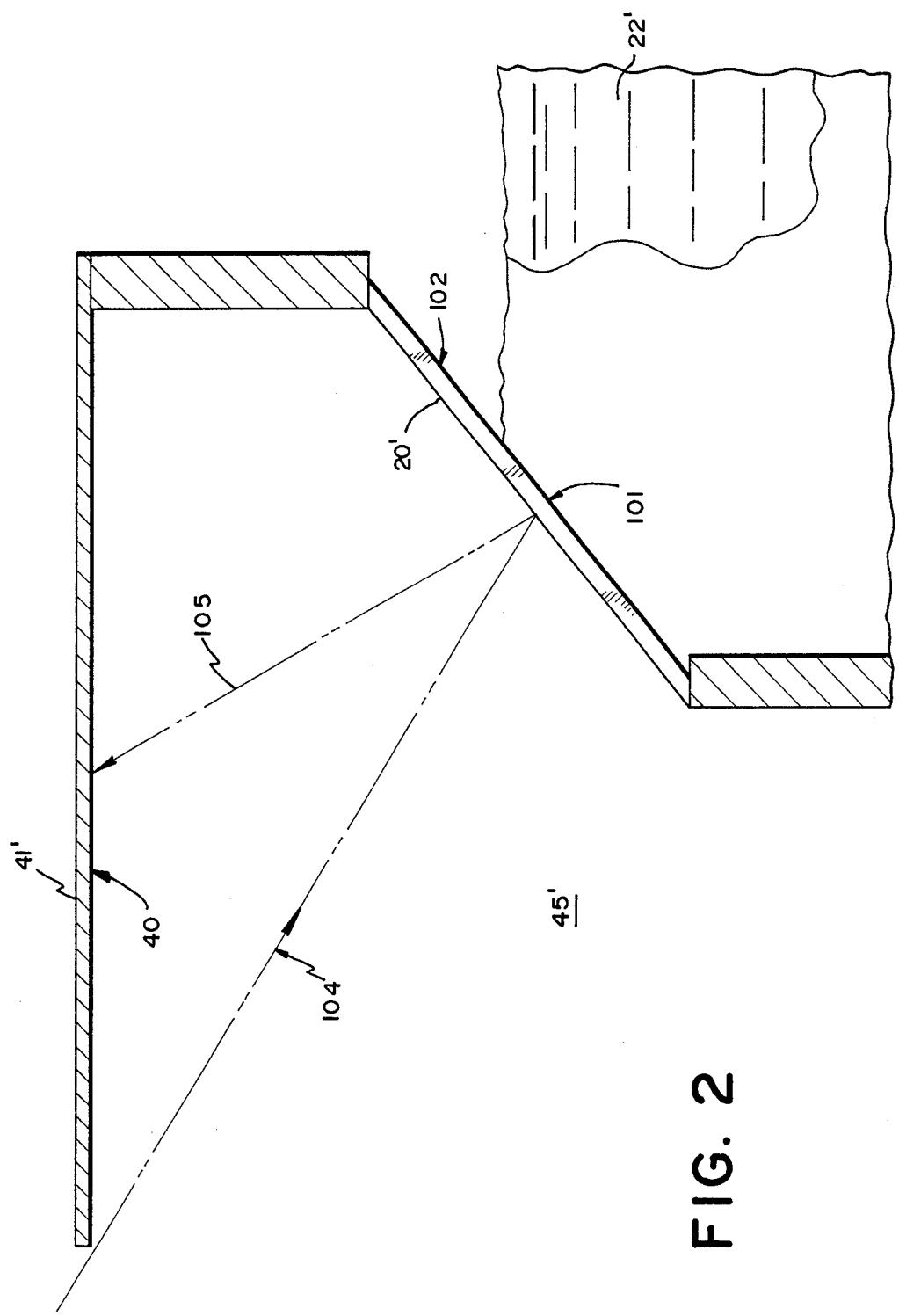

Particular critical interactions and unsolved problems occur in the aquarium environment at the water interface that have not been heretofore addressed and solved and no such non-reflective structure as herein disclosed have heretofore been used in aquarium structures. This invention embodiment employs the curved window-lens 20 structure, which changes the viewing optics at the water-to-glass-to-air interface. It furthermore strengthens the viewing pane against internal water pressure and permits a thinner window that tends to decrease further reflection interference from internal reflections within the thickness of the pane. It further reduces the length of the ledge 40 used to absorb secondary reflections with the blackened surface, as compared for example with a flat surface window, which could be used alternatively, as shown in FIG. 2, to reduce interference from reflections in simplified embodiment of an improved aquarium structure afforded by the teachings of this invention.

The blackened surface 40 terminates at a plane 69, outside the cone of viewing rays directed toward focal point 30. The ledge portion extending beyond plane 69 also may comprise a mounting for the electric lamps 71, which could be shielded by appropriate opaque structure at 69 so that they do not directly shine into the aquarium window 20 from an angle reflecting back into the eyes of observers 46, 47. Conversely, for inside rooms, the lamps 71 may light the preferably white floor surface 78 to improve visibility to the observers moving about within the observer chamber 45.

Note that the light level in the outer viewing compartment 45, which may constitute a room, chamber or patio, for example, may be quite high, even coming from direct sunlight. The main restriction on external lighting, such as electric lamps 70, 71 or sunlight is that it is not positioned for directing primary light rays for reflection off the curved window 20 toward the observers 46, 47. Rather the light ray paths 61-64 reflected off the window 20 surface into view of observers 46, 47 are substantially entirely free of light since they are intercepted by the blackened surface 40 of ledge 41 for absorbing direct or reflecting light rays observable by observers 46, 47.

Furthermore, such external lighting as required for an aquarium sign 75 is arranged in a reflective surface 76 that directs the light rays away from the viewing window 20 to prevent glare and unfavorable reactions with the aquarium environment. Also bright lights, such as lamps 71, for lighting the observation chamber 45 if used, provide no significant emerging amount of the direct light rays excident therefrom directed toward the viewing window 20, where they might cause reflections or growth of algae.

The ledge 79, adjacent to window 20, could also carry a lighted or unlighted information panel regarding the contents of the aquarium, if desired. That ledge furthermore serves to keep the observers outside the viewing cone bordered by line 72 as suggested by the arrow-line notation at the face of the adult observer 47. Thus, the observer does not see his own reflection mirrored by the window 20. Furthermore, the ledge 79 serves to reduce the incidence of secondary light rays that might be reflected from floor 78, etc. off window 20 from disturbing the view into the water tank 15.

Note that the thinner the glass window 20, the less disturbance from internal reflections in the glass caused at the water-to-glass and air-to-glass interfaces. Thus, the curvature of the window permitting the thinner glass is a significant factor in the improved viewing into the aquarium.

In FIG. 2, primed reference characters relate to modified features similar to those already described in FIG. 1 to facilitate comparison. This simplified view has a flat window 20', and a longer overhanging ledge 41', for the purpose of reducing glare and reflections. This is illustrated by reflection path 105 from a viewer that cannot "look" into the incident direct light rays 104, but rather views the dark surface 40 of less brightness than the interior of tank 22'. Thus, as in the preferred embodiment, line of sight rays reflected off windows 20' into the dark light absorbing surface 40, to prevent for example, the line of sight viewing of sunlight along pathway 104 appearing as a reflecting glare in the eyes of an observer.

The glass window 20', slanted from vertical, provides an interface between the air and water body 22' that improves viewing into the water from the observation station 45'. The water to glass interface 101 and air to glass interface 102 illustrates aquarium construction to view aquatic life or amphibious wildlife other than fishlife such as frogs and turtles. In such applications, the flat window may be preferred as a lower cost and conventional window pane than the curved window-lens surface hereinbefore described.

Having therefore improved the state of the aquarium arts, by affording a multiple purpose interface window between an aquarium water body and an observer chamber for viewing aquatic life, particularly of advantage in public aquarium facilities, those features of novelty afforded by this invention are defined with particularity in the following claims.

I claim:

1. An aquarium with a viewing window interface between a water body and an observation viewing chamber from which a viewing audience looks into the aquarium, said window interface being so constructed for affording observers in the observation chamber an improved viewing visibility of aquatic life from an observer environment in the presence of light rays external to the aquarium and directed onto the window interface, providing attenuated reflections and interference accompanying a direct view into the aquarium, comprising in combination, a water body containing a viewing window located between the water body and the viewing audience for establishing a substantially unimpeded view for the viewing audience into the aquarium, said window being inwardly curved into the water body to present the viewing interface for observing therethrough the underwater behavior of aquatic life, a light excluding wall opposite the viewing window, and said observation chamber being positioned outside the water body adjacent to said inwardly curved window.

2. The aquarium of claim 1 wherein said observer viewing structure further comprises:

controlled lighting means exterior to the water body and positioned in the observer viewing chamber for lighting the viewing chamber with means transmitting light rays therefrom away from the viewing window.

3. The aquarium of claim 1 further comprising:

lighting means positioned in said chamber outside the water body with associated light directing means sending light from said lighting means into said observer viewing chamber in a direction transmitted away from said viewing window to avoid reflections off the window.

4. The aquarium of claim 1 wherein said viewing window further comprises:

a window surface generally slanted upwardly off-vertical having a curvature with a locus of curvature outside the tank for directing direct light reflections on the window exterior away from an observation viewing station in said chamber where said audience looks into the aquarium.

5. The aquarium of claim 4 further comprising:

an overhanging ledge leading outwardly from said wall into the viewing chamber toward said locus, and a light absorbing surface in a position on said ledge in the line of sight of viewing rays reflected from the window back towards the viewing chamber audience.

6. A water body having an outer wall for containing water and marine life, a window in said wall in contact with the water for viewing marine life from an observation chamber outside said water body, light excluding walls opposite said window, an overhanging ledge extending outwardly from and above said window having a light absorbing surface in the line of sight of reflections off the window, said ledge overlying said observation chamber and said window comprising a window panel slanted with respect to said observation chamber to restrict direct light ray reflections off the window from the observation chamber from view by observers in said observation chamber that impede observation of the marine life in said water body.

7. The aquarium defined in claim 6 wherein said window panel further comprises a curved reflecting surface having a locus of curvature outside said tank in the region of said overhanging ledge.

8. The aquarium of claim 6 wherein said observation chamber comprising a lighted enclosure with lighting means therein positioned with light directing structure for transmitting direct light rays from the lighting means into the chamber in a direction away from the viewing window.

9. An aquarium for viewing aquatic life confined in a water body with viewing means defining an observation chamber having a window looking into said water body, said observation chamber locating aquarium audience viewers to look into the water body comprising a reflective transparent window between the observation chamber and the water body and a light absorbing surface disposed above the observation chamber, said window being angled inwardly away from the chamber to reflect external light rays originating from the chamber towards the light absorbing surface, and light excluding walls opposite the viewing window.

10. A viewing interface at an air to water surface comprising in combination, a water body, an air body, an observer station in the air body from which an audience looks into the water body, a viewing window in contact with both said air and water bodies on opposite surfaces thereof positioned in said observer station, light excluding walls opposite the viewing window, an overhanging ledge extending outwardly from and above said window having a light absorbing surface in the line of reflections off the window, said ledge overlying said observer chamber, said window angled inwardly away from the station to direct light rays that occur in said observer station towards said light absorbing surface so light reflecting off the air side window surface will not interfere with the visibility of observers at the observer station when looking into the water body.

* * * * *